United States Patent
Nakanishi et al.

(10) Patent No.: US 12,491,769 B2
(45) Date of Patent: Dec. 9, 2025

(54) SPINNING AND SLIDING DETECTION DEVICE AND SPINNING AND SLIDING DETECTION METHOD

(71) Applicant: Mitsubishi Electric Corporation, Tokyo (JP)

(72) Inventors: Akira Nakanishi, Tokyo (JP); Satoru Matsuoka, Tokyo (JP); Koji Shiratsuchi, Tokyo (JP); Masashi Asuka, Tokyo (JP); Makoto Tokumaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/554,282

(22) PCT Filed: May 25, 2021

(86) PCT No.: PCT/JP2021/019806
§ 371 (c)(1),
(2) Date: Oct. 6, 2023

(87) PCT Pub. No.: WO2022/249280
PCT Pub. Date: Dec. 1, 2022

(65) Prior Publication Data
US 2024/0181889 A1    Jun. 6, 2024

(51) Int. Cl.
*B60L 3/00*    (2019.01)

(52) U.S. Cl.
CPC ......... *B60L 3/0038* (2013.01); *B60L 2200/26* (2013.01)

(58) Field of Classification Search
CPC ........ B60L 3/00; B60L 3/0023; B60L 3/0038; B60L 15/20; B61L 1/00; B61L 1/163;
(Continued)

(56) References Cited

U.S. PATENT DOCUMENTS 7,103,460 B1 * 9/2006 Breed ................. G07C 5/008
706/15
10,829,097 B2    11/2020 Tokumaru
(Continued)

FOREIGN PATENT DOCUMENTS

EP    3939820 A1    1/2022
EP    3988371 A1    4/2022
(Continued)

OTHER PUBLICATIONS

International Search Report (PCT/ISA/210) with English translation and Written Opinion (PCT/ISA/237) mailed on Aug. 3, 2021, by the Japanese Patent Office as the International Searching Authority for International Application No. PCT/JP2021/019806.
(Continued)

*Primary Examiner* — John Kwon
(74) *Attorney, Agent, or Firm* — Buchanan Ingersoll & Rooney PC (57) ABSTRACT

A spinning and sliding detection device in a train includes: a change detection unit that periodically acquires a first detected value from a speed sensor, calculates a first change amount, using the first detected values, periodically acquires a second detected value from an acceleration sensor, calculates a second change amount, using the second detected values, and selects a change mode from a plurality of change modes defined for determining whether spinning or sliding has occurred at the train, using the first change amount, the second change amount, a first threshold, and a second threshold and outputs the selected change mode; and a spinning and sliding determination unit that determines whether spinning or sliding has occurred at the train and determines whether an anomaly has occurred in either the speed sensor or the acceleration sensor, based on the change mode acquired from the change detection unit.

18 Claims, 7 Drawing Sheets

(58) Field of Classification Search
CPC ... B61L 1/166; B61K 9/12; G01P 3/36; G01P 3/38; G01P 3/68
See application file for complete search history.

(56) References Cited

U.S. PATENT DOCUMENTS

| | | | | |
|---|---|---|---|---|
| 2005/0192727 A1* | 9/2005 | Shostak | ............... | G07C 5/0808 |
| | | | | 701/1 |
| 2005/0273218 A1* | 12/2005 | Breed | ............... | G06K 7/10178 |
| | | | | 701/2 |
| 2010/0308969 A1* | 12/2010 | Okada | ................... | G01D 21/00 |
| | | | | 340/10.1 |
| 2018/0112727 A1* | 4/2018 | Ono | ........................ | F16D 48/02 |

FOREIGN PATENT DOCUMENTS

| | | | |
|---|---|---|---|
| JP | 2001157316 | A | 6/2001 |
| JP | 2002325307 | A | 11/2002 |
| JP | 2012034456 | A | 2/2012 |
| JP | 2014176280 | A | 9/2014 |
| JP | 6279446 | B2 | 1/2018 |
| JP | 2021002948 | A | 1/2021 |
| WO | 2017046852 | A1 | 3/2017 |
| WO | 2020188870 | A1 | 9/2020 |

OTHER PUBLICATIONS

Notice of Reason for Refusal issued in corresponding Japanese Application No. 2021-565135 dated Jan. 31, 2022, with English Translation, 12 pages.
Office Action dated Oct. 14, 2025, issued in the corresponding Indian Patent Application No. 202327071084. (7 pages).

* cited by examiner

SPINNING AND SLIDING DETECTION DEVICE AND SPINNING AND SLIDING DETECTION METHOD

FIELD

The present disclosure relates to a spinning and sliding detection device and a spinning and sliding detection method for detecting spinning and sliding occurring at a train.

BACKGROUND

To achieve high-density train operation, it has been required to precisely determine the positions of trains traveling. However, events such as spinning and sliding may occur at trains, depending on the state of contact surfaces between the wheels of the trains and rails. If spinning, sliding, etc. occurs at a train, a train position calculated using a signal output from a speed generator etc. deviates from an actual train position. To correct the train position, therefore, it is also required to accurately detect spinning, sliding, etc. occurring at the train. For the technique disclosed in patent Literature 1, an on-board device installed in a train detects the occurrence of spinning or sliding at the train from a difference between accelerations obtained from detected values of a speed generator and an inertial sensor, and corrects travel information including the travel position of the train etc., on the basis of a difference between jerks obtained from detected values of the speed generator and the inertial sensor.

CITATION LIST

Patent Literature

Patent Literature 1: Japanese Patent No. 6279446

SUMMARY OF INVENTION

Problem to be Solved by the Invention

The on-board device described in Patent Literature 1 performs various determinations on the basis of differences between accelerations and jerks obtained from detected values of the speed generator and the inertial sensor. A problem with the on-board device described in Patent Literature 1 is that if an anomaly occurs in a sensor, various determinations are performed on the basis of wrong detected values, and thus there is a possibility of false detection of the occurrence of spinning, sliding, etc.

The present disclosure has been made in view of the above. It is an object of the present disclosure to provide a spinning and sliding detection device that can prevent a decrease in the accuracy of detection of spinning and sliding occurring at a train.

Means to Solve the Problem

To solve the above problem and achieve the object, the present disclosure provides a spinning and sliding detection device to be installed in a train. The device comprises: a change detection unit to periodically acquire a first detected value from a first sensor to detect a rotational state of a wheel of the train, calculate a first change amount, using the first detected values, periodically acquire a second detected value from a second sensor to detect speed or acceleration of the train, calculate a second change amount, using the second detected values, and select a change mode from a plurality of change modes defined for determining whether spinning or sliding has occurred at the train, using the first change amount, the second change amount, a first threshold, and a second threshold and output the selected change mode; and a spinning and sliding determination unit to determine whether spinning or sliding has occurred at the train and determine whether an anomaly has occurred in either the first sensor or the second sensor, on a basis of the change mode acquired from the change detection unit.

Effects of the Invention

The spinning and sliding detection device of the present disclosure has the effect of preventing the decrease in the accuracy of detection of spinning and sliding occurring at the train.

DESCRIPTION OF EMBODIMENTS

A spinning and sliding detection device and a spinning and sliding detection method according to embodiments of the present disclosure will be hereinafter described in detail with reference to the drawings.

First Embodiment

Figure 1:
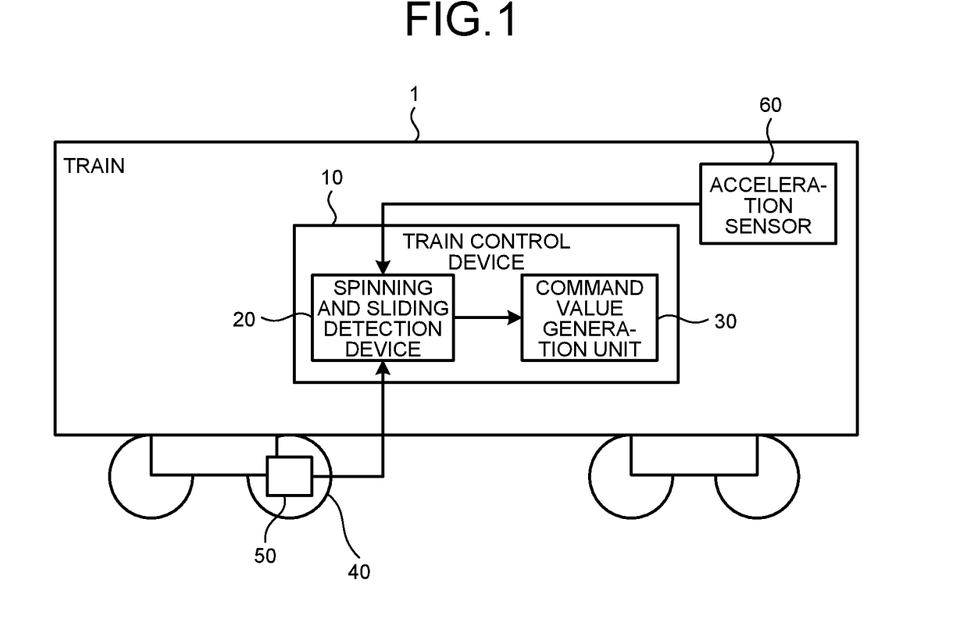
FIG. 1 is a diagram illustrating an example configuration of a train equipped with a spinning and sliding detection device according to a first embodiment.

FIG. 1 is a diagram illustrating an example configuration of a train 1 equipped with a spinning and sliding detection device 20 according to a first embodiment. The train 1 includes a train control device 10, a speed sensor 50, and an acceleration sensor 60. For the simplicity of the description, the train 1 in the example of FIG. 1 includes one vehicle but may include two or more vehicles. The train control device 10 includes the spinning and sliding detection device 20 and a command value generation unit 30. The train control device 10, that is, the spinning and sliding detection device 20 and the command value generation unit 30 are installed in the train 1. The spinning and sliding detection device 20 determines whether spinning or sliding has occurred at the train 1, and outputs a determination result to the command value generation unit 30. On the basis of the determination result acquired from the spinning and sliding detection device 20, the command value generation unit 30 generates a command value to control the travel of the train 1.

The speed sensor 50 detects the rotational state of a wheel 40 of the train 1 and outputs speed information on the train 1 based on the rotation of the wheel 40 of the train 1 or a signal for calculating the speed of the train 1. The speed information on the train 1 output by the speed sensor 50 or the signal for calculating the speed of the train 1 is referred to as a first detected value. The speed sensor 50 is referred to as a first sensor. The acceleration sensor 60 detects the acceleration of the train 1 and outputs acceleration information on the train 1. The acceleration information on the train 1 output by the acceleration sensor 60 is referred to as a second detected value. The acceleration sensor 60 is referred to as a second sensor.

Figure 2:
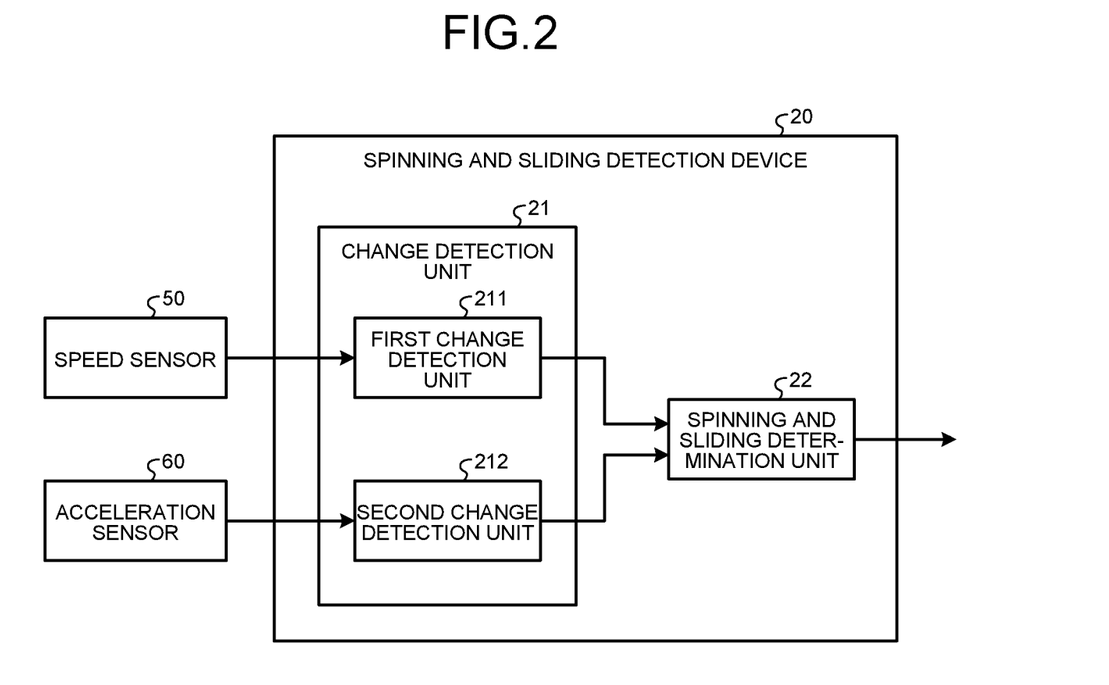
FIG. 2 is a diagram illustrating an example configuration of the spinning and sliding detection device according to the first embodiment.

FIG. 2 is a diagram illustrating an example configuration of the spinning and sliding detection device 20 according to the first embodiment. The spinning and sliding detection device 20 includes a change detection unit 21 and a spinning and sliding determination unit 22. The change detection unit 21 periodically acquires the first detected value from the speed sensor 50, and calculates a first change amount, using the first detected values. The change detection unit 21 periodically acquires the second detected value from the acceleration sensor 60 that detects the acceleration of the train 1, and calculates a second change amount, using the second detected values. Using the first change amount, the second change amount, a first threshold, and a second threshold, the change detection unit 21 selects a change mode from a plurality of change modes defined for determining whether spinning or sliding has occurred at the train 1, and outputs the selected change mode. The change detection unit 21 includes a first change detection unit 211 and a second change detection unit 212.

The first change detection unit 211 periodically acquires the first detected value from the speed sensor 50, and calculates the first change amount, using the first detected values. On the basis of a comparison result obtained by comparing the first change amount with the first threshold, the first change detection unit 211 selects one first change mode from a plurality of first change modes, and outputs the selected first change mode. The plurality of first change modes, which are the above-described plurality of change modes, indicate states of change in the first detected value. In the present embodiment, specifically, the first change detection unit 211 periodically calculates a first acceleration of the train 1, using first speeds that are the first detected values of the train 1 acquired from the speed sensor 50, periodically calculates a first jerk of the train 1, using the first accelerations, and uses the first jerk as the first change amount. The first threshold may be one or a plurality of first thresholds. For the first speed of the train 1, the first change detection unit 211 may calculate the first speed from pulse information that is the signal output from the speed sensor 50, or may acquire the first speed as the speed information obtained by converting the pulse information into a speed output from the speed sensor 50. To simplify the description, the present embodiment is described taking an example in which the first change detection unit 211 acquires the first speed as the speed information.

The second change detection unit 212 periodically acquires the second detected value from the acceleration sensor 60, and calculates the second change amount, using the second detected values. On the basis of a comparison result obtained by comparing the second change amount with the second threshold, the second change detection unit 212 selects one second change mode from a plurality of second change modes, and outputs the selected second change mode. The plurality of second change modes, which are the above-described change modes, indicate states of change in the second detected value. In the present embodiment, specifically, the second change detection unit 212 calculates a second jerk of the train 1, using second accelerations of the train 1 acquired from the acceleration sensor 60, and uses the second jerk as the second change amount. The second threshold may be one or a plurality of second thresholds.

On the basis of the change mode acquired from the change detection unit 21, the spinning and sliding determination unit 22 determines whether spinning or sliding has occurred at the train 1, and determines whether an anomaly has occurred in either the speed sensor 50 or the acceleration sensor 60. In the present embodiment, specifically, on the basis of a combination of the first change mode and the second change mode, the spinning and sliding determination unit 22 determines whether spinning or sliding has occurred at the train 1, and determines whether an anomaly has occurred in either the speed sensor 50 or the acceleration sensor 60.

Figure 3:
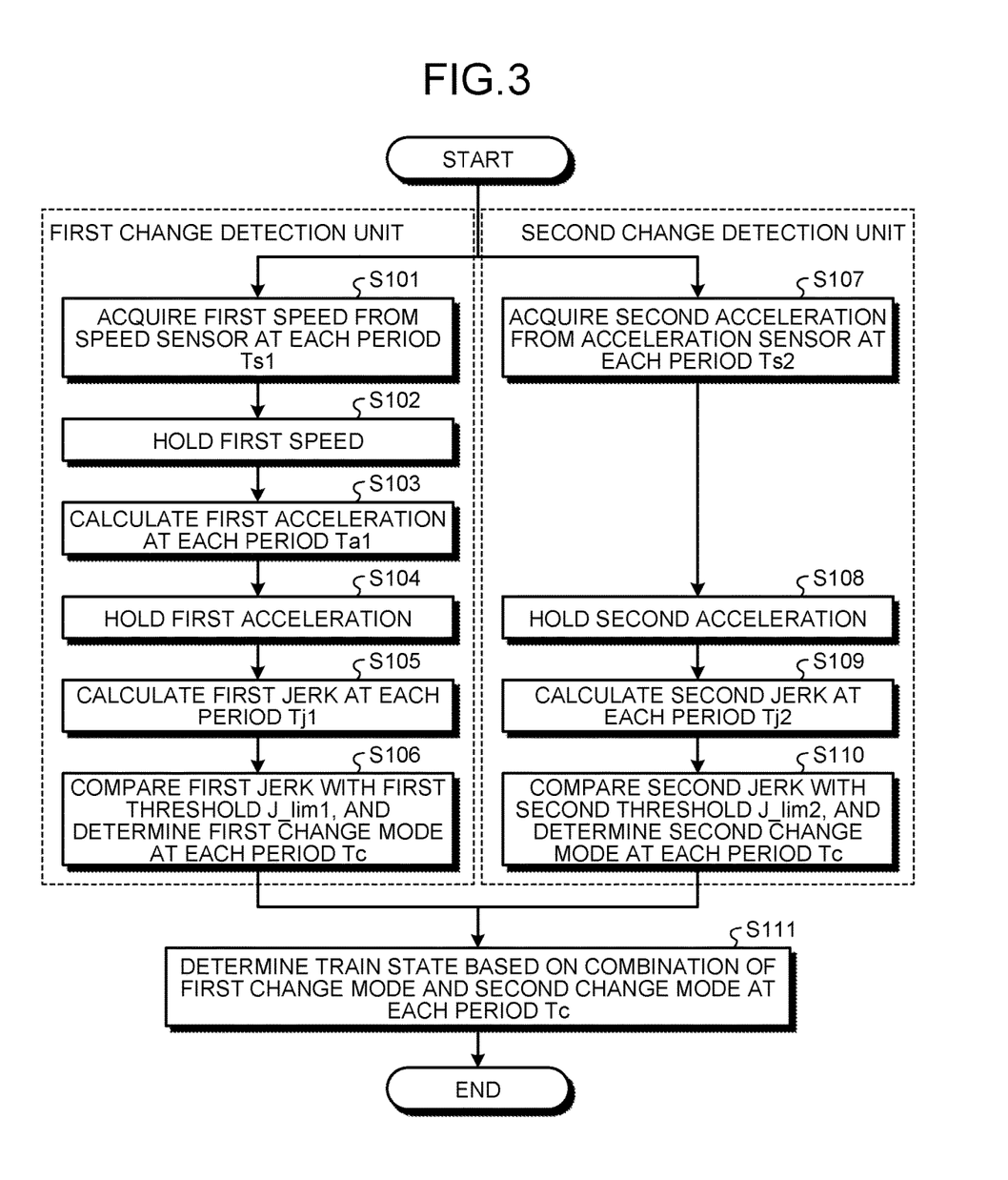
FIG. 3 is a flowchart illustrating the operation of the spinning and sliding detection device according to the first embodiment.

The operation of the spinning and sliding detection device 20 will be described. FIG. 3 is a flowchart illustrating the operation of the spinning and sliding detection device 20 according to the first embodiment.

The first change detection unit 211 acquires the first speed, which is the first detected value, from the speed sensor 50 of the wheel 40 at each period Ts1 (step S101), and holds the acquired first speed (step S102). Using the held first speeds, the first change detection unit 211 calculates the first acceleration, which is the acceleration of the wheel 40, at each period Ta1 (step S103), and holds the calculated first acceleration (step S104). For example, the first change detection unit 211 calculates the first acceleration from the period Ta1 and a difference between the time series of the first speeds. Using the held first accelerations, the first change detection unit 211 calculates the first jerk, which is the jerk of the wheel 40, at each period Tj1 (step S105). The first jerk is defined as the first change amount. For example, the first change detection unit 211 calculates the first jerk from the period Tj1 and a difference between the time series of the first accelerations. The first change detection unit 211 compares the first jerk with a predetermined first threshold J_lim1, and determines the first change mode at each period Tc, on the basis of the comparison result (step S106). The first threshold J_lim1 as described herein is single. In this case, the number of the first change modes is two: the first jerk is less than the first threshold J_lim1; and the first jerk is greater than or equal to the first threshold J_lim1. The first change detection unit 211 selects one of these two modes, as the first change mode and outputs the selected mode to the spinning and sliding determination unit 22.

Note that in the first change detection unit 211, the period Ta1 at which to calculate the first acceleration, the period Tj1 at which to calculate the first jerk, and the period Tc at which to determine the first change mode do not need to be the same as the period Ts1, i.e., a sampling period at which to acquire the first speed from the speed sensor 50, and these periods Ta1, Tj1, Tc may be different from one another. For example, when the period Tc is P times the period Tj1, the first change detection unit 211 may determine the first change mode on the basis of the result of a comparison between the first threshold J_lim1 and a mean value obtained by averaging P first jerks. The period Ta1 at which to calculate the first acceleration and the period Tj1 at which to calculate the first jerk may be variable depending on the speed of the train 1.

The second change detection unit 212 acquires the second acceleration, which is the second detected value, from the acceleration sensor 60 of the vehicle of the train 1 at each period Ts2 (step S107), and holds the acquired second acceleration (step S108). Using the held second accelerations, the second change detection unit 212 calculates the second jerk, which is the jerk of the vehicle of the train 1, at each period Tj2 (step S109). The second jerk is defined as the second change amount. For example, the second change detection unit 212 calculates the second jerk from the period Tj2 and a difference between the time series of the second accelerations. The second change detection unit 212 compares the second jerk with a predetermined second threshold J_lim2, and determines the second change mode at each period Tc, on the basis of the comparison result (step S110). The second threshold J_lim2 described herein is single. In this case, the number of the second change modes is two: the second jerk is less than the second threshold J_lim2; and the second jerk is greater than or equal to the second threshold J_lim2. The second change detection unit 212 selects one of these two modes as the second change mode and outputs the selected mode to the spinning and sliding determination unit 22.

Note that in the second change detection unit 212, the period Tj2 at which to calculate the second jerk and the period Tc at which to determine the second change mode do not need to be the same as the period Ts2, i.e., a sampling period at which to acquire the second acceleration from the acceleration sensor 60, and these periods Tj2, Tc may be different from one another. For example, when the period Tc is P times the period Tj2, the second change detection unit 212 may determine the second change mode on the basis of the result of a comparison between the second threshold J_lim2 and a mean value obtained by averaging P second jerks. The period Tj2 at which to calculate the second jerk may be variable depending on the speed of the train 1.

Although steps S101 to S110 has been described in this order, the change detection unit 21 may perform the operation of the first change detection unit 211 from steps S101 to S106 and the operation of the second change detection unit 212 from steps S107 to S110 in parallel.

The spinning and sliding determination unit 22 determines the state of the train 1 at each period Tc, on the basis of a combination of the first change mode acquired from the first change detection unit 211 and the second change mode acquired from the second change detection unit 212 (step S111). In the present embodiment, as described above, there are the two first change modes: the first change amount is less than the first threshold J_lim1; and the first change amount is greater than or equal to the first threshold J_lim1. There are the two second change modes: the second change amount is less than the second threshold J_lim2; and the second change amount is greater than or equal to the second threshold J_lim2. Thus, the spinning and sliding determination unit 22 determines the state of the train 1, using 2×2=4 patterns defined by combinations of the first change modes and the second change modes. The combinations of the first change modes and the second change modes define four possible patterns: (1) the first change amount is less than the first threshold J_lim1, and the second change amount is less than the second threshold J_lim2; (2) the first change amount is less than the first threshold J_lim1, and the second change amount is greater than or equal to the second threshold J_lim2; (3) the first change amount is greater than or equal to the first threshold J_lim1, and the second change amount is less than the second threshold J_lim2; and (4) the first change amount is greater than or equal to the first threshold J_lim1, and the second change amount is greater than or equal to the second threshold J_lim2.

When spinning occurs at the train 1, the speed calculated from the number of revolutions of the wheel 40 rapidly increases. When sliding occurs at the train 1, the speed calculated from the number of revolutions of the wheel 40 rapidly decreases. As the vehicle of the train 1 continues to move by inertia even when spinning or sliding occurs at the train 1, the acceleration sensor 60 outputs acceleration considered within a normal travel range. The spinning and sliding determination unit 22 can therefore determine that: in pattern (1) of the above-described four combination patterns, the train 1 is in a normal travel state; in pattern (2), an anomaly of either the speed sensor 50 or the acceleration sensor 60; in pattern (3), spinning or sliding has occurred at the train 1; and in pattern (4), the train 1 has suddenly been accelerated or decelerated due to a collision of the train 1, etc.

A description is hereinafter given of the effect of determination by the spinning and sliding detection device 20, using sensor outputs, i.e., the change amounts of detected values from the speed sensor 50 and the acceleration sensor 60 in the present embodiment. When the travel state of the train 1 is measured using sensors such as the speed sensor 50 and the acceleration sensor 60, the absolute amounts of detected values of the sensors include low frequency variation components such as a gravitational acceleration component due to the gradient of a travel section of the train 1, an attachment error, a zero point deviation, a sensitivity error, a temperature change, a time-varying change, a non-linear error. Consequently, the sensors such as the speed sensor 50 and the acceleration sensor 60 may output values larger than the actual acceleration of the train 1. The low frequency variation components are components that change slowly as compared with sensor-specific offsets included in outputs, i.e., detected values from the sensors, or the period Tc of spinning and sliding determination. Such low frequency variation components are frequency components lower than the frequency components of spinning or sliding occurring at the train 1. In view of this, the first change detection unit 211 and the second change detection unit 212 of the spinning and sliding detection device 20 in the present embodiment calculate jerks as the change amounts of accelerations that cancel out the above-described low frequency variation components, and the calculated jerks are used in the determination by comparison with the thresholds.

The spinning and sliding determination unit 22 outputs, to the command value generation unit 30 at each period Tc, the result of a determination from a combination of the first change mode acquired from the first change detection unit 211 and the second change mode acquired from the second change detection unit 212. The period of transmission of a determination result from the spinning and sliding determination unit 22 to the command value generation unit 30 does not need to be the same as the determination period Tc. If the transmission period is Q times the period Tc, the spinning and sliding determination unit 22 may output one determination result obtained on the basis of Q determination results. For example, the spinning and sliding determination unit 22 transmits a determination result obtained by majority decision among Q determination results. If chattering occurs in the first change mode and the second change mode, the spinning and sliding determination unit 22 may output a determination result in such a manner as to maintain a mode determined by majority decision if Q determination results include a certain number or more of any modes other than mode (1), and next, until mode (1) becomes a sufficient majority compared to the other modes, continue to maintain the mode other than mode (1), that is, one of the modes (2), (3), and (4).

The above description has been made in detail as to an example in which each of the first threshold and the second threshold is single, but two or more first thresholds and two or more second thresholds may be used as described above. The first change detection unit 211 may use R first thresholds (R is an integer greater than or equal to two), select one first change mode from M first change modes (M is an integer greater than or equal to three), and output the selected first change mode. The second change detection unit 212 may use S second thresholds (S is an integer greater than or equal to two), select one second change mode from N second change modes (N is an integer greater than or equal to three), and output the selected second change mode. In this case, the spinning and sliding determination unit 22 can output the state of the train 1 more precisely to the command value generation unit 30, using determination results of M×N=K patterns.

For example, in step S106 of the flowchart illustrated in FIG. 3, the first change detection unit 211 can determine the first change mode, using first thresholds that are a first threshold J_lim11 of the acceleration change amount for determining a clear spinning or sliding state, and a first threshold J_lim12 of the acceleration change amount for determining a pre-spinning or sliding state. The first threshold J_lim11>the first threshold J_lim12. Specifically, the first change detection unit 211 outputs the first change mode varying depending on whether the first jerk is less than the first threshold J_lim12, whether the first jerk is greater than or equal to the first threshold J_lim12 and less than the first threshold J_lim11, and whether the first jerk is greater than or equal to the first threshold J_lim11. The first change detection unit 211 may count the number of times a determination result indicating the above-described pre-spinning or sliding state continues. When the determination result has continued a specified number of times or more, for example, the first change detection unit 211 may output a different first change mode, determining the clear spinning or sliding state. In the case of the first threshold for determining the clear spinning or sliding state or the pre-spinning or sliding state, the first threshold may vary depending upon whether the first jerk has a positive value or a negative value as the characteristics of the train 1 is asymmetric between when the acceleration increases and when the acceleration decreases.

In step S110 of the flowchart illustrated in FIG. 3, the second change detection unit 212 can determine the second change mode, using second thresholds that are a second threshold J_lim21 of the acceleration change amount for determining a clear sensor anomaly, and a second threshold J_lim22 of the acceleration change amount for determining a pre-sensor anomaly state. The second threshold J_lim21>the second threshold J_lim22. Specifically, the second change detection unit 212 outputs the second change mode varying depending on whether the second jerk is less than the second threshold J_lim22, whether the second jerk is greater than or equal to the second threshold J_lim22 and less than the second threshold J_lim21, and whether the second jerk is greater than or equal to the second threshold J_lim21. The second change detection unit 212 may count the number of times a determination result indicating the above-described pre-sensor anomaly state continues. When the determination result has continued a specified number of times or more, for example, the second change detection unit 212 may output a different second change mode, determining the clear sensor anomaly.

As described above, when there are three or more first change modes as the plurality of first change modes, and there are three or more second change modes as the plurality of second change modes, the spinning and sliding determination unit 22 can further determine a sign of occurrence of spinning or sliding at the train 1, and determine a sign of an anomaly of either the speed sensor 50 or the acceleration sensor 60. For example, when the first change detection unit 211 have two first thresholds and outputs first change modes of three patterns, and the second change detection unit 212 has two second thresholds and outputs second change modes of three patterns, the spinning and sliding determination unit 22 can expect to provide determination results of 3×3=9 patterns defined by combinations of the first change modes and the second change modes. Note that the spinning and sliding determination unit 22 may not provide different determination results for all of the nine patterns, but provide the same determination result for two or more patterns of the nine patterns.

Next, a hardware configuration of the spinning and sliding detection device 20 according to the first embodiment will be described. In the spinning and sliding detection device 20, the change detection unit 21 and the spinning and sliding determination unit 22 are implemented by processing circuitry. The processing circuitry may be memory storing a program and a processor that executes the program stored in the memory, or may be dedicated hardware. The processing circuitry is also referred to as a control circuit.

Figure 4:
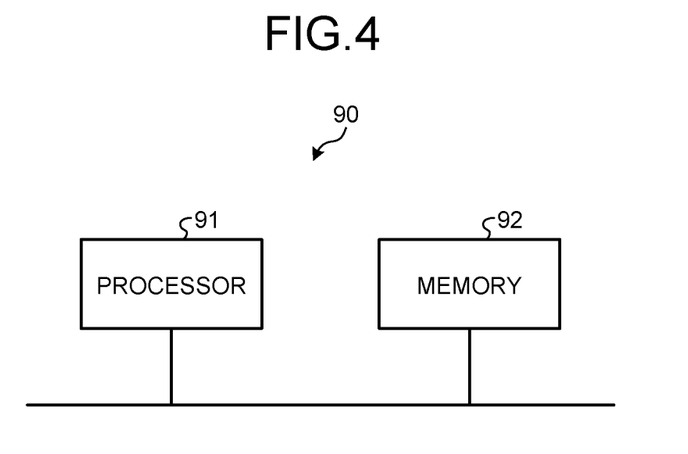
FIG. 4 is a diagram illustrating an example of a configuration of processing circuitry when a processor and memory implement processing circuitry of the spinning and sliding detection device according to the first embodiment.

FIG. 4 is a diagram illustrating an example of a configuration of processing circuitry 90 when a processor 91 and memory 92 implement processing circuitry included in the spinning and sliding detection device 20 according to the first embodiment. The processing circuitry 90 illustrated in FIG. 4 is a control circuit and includes the processor 91 and the memory 92. When the processor 91 and the memory 92 constitute the processing circuitry 90, functions of the processing circuitry 90 are implemented by software, firmware, or a combination of software and firmware. The software or firmware is described as a program and stored in the memory 92. In the processing circuitry 90, the processor 91 reads and executes the program stored in the memory 92, thereby implementing the functions. That is, the processing circuitry 90 includes the memory 92 for storing the program that results in the execution of the processing in the spinning and sliding detection device 20. This program can be said to be a program for causing the spinning and sliding detection device 20 to perform the functions implemented by the processing circuitry 90. This program may be provided via a storage medium on which the program is stored, or may be provided via another means such as a communication medium.

The above program can be said to be a program to cause the spinning and sliding detection device 20 to perform: a first step in which the change detection unit 21 periodically acquires the first detected value from the speed sensor 50 that detects the rotational state of the wheel 40 of the train 1, calculates the first change amount, using the first detected values, periodically acquires the second detected value from the acceleration sensor 60 that detects the acceleration of the train 1, calculates the second change amount using the second detected values, and selects a change mode from the plurality of change modes defined for determining whether spinning or sliding has occurred at the train 1, using the first change amount, the second change amount, the first threshold, and the second threshold and outputs the selected change mode; and a second step in which, on the basis of the change mode acquired from the change detection unit 21, the spinning and sliding determination unit 22 determines whether spinning or sliding has occurred at the train 1 and determines whether an anomaly has occurred in either the speed sensor 50 or the acceleration sensor 60.

Here, the processor 91 is, for example, a central processing unit (CPU), a processing unit, an arithmetic device, a microprocessor, a microcomputer, a digital signal processor (DSP), or the like. The memory 92 corresponds, for example, to nonvolatile or volatile semiconductor memory such as random-access memory (RAM), read-only memory (ROM), flash memory, an erasable programmable ROM (EPROM), or an electrically EPROM (EEPROM) (registered trademark), or a magnetic disk, a flexible disk, an optical disk, a compact disk, a mini disk, a digital versatile disc (DVD), or the like.

Figure 5:
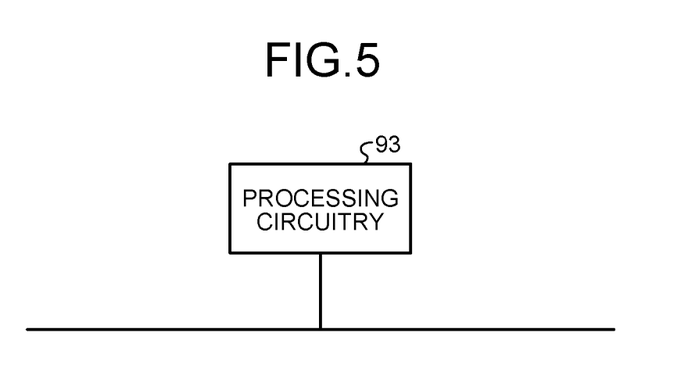
FIG. 5 is a diagram illustrating an example of a configuration of processing circuitry when dedicated hardware constitutes the processing circuitry of the spinning and sliding detection device according to the first embodiment.

FIG. 5 is a diagram illustrating an example of a configuration of processing circuitry 93 when dedicated hardware constitutes the processing circuitry included in the spinning and sliding detection device 20 according to the first embodiment. The processing circuitry 93 illustrated in FIG. 5 corresponds, for example, to a single circuit, a combined circuit, a programmed processor, a parallel-programmed processor, an application-specific integrated circuit (ASIC), a field-programmable gate array (FPGA), or a combination of them. The processing circuitry 93 may be implemented partly by dedicated hardware and partly by software or firmware. Thus, the processing circuitry 93 can implement the above-described functions by dedicated hardware, software, firmware, or a combination of them.

As described above, according to the present embodiment, in the spinning and sliding detection device 20, the first change detection unit 211 calculates the first jerk, using the first detected values acquired from the speed sensor 50, selects one of the plurality of first change modes on the basis of the result of a comparison between the first jerk and the first threshold J_lim1, and outputs the selected first change mode. The second change detection unit 212 calculates the second jerk, using the second detected values acquired from the acceleration sensor 60, selects one of the plurality of second change modes on the basis of the result of a comparison between the second jerk and the second threshold J_lim2, and outputs the selected second change mode. On the basis of a combination of the first change mode and the second change mode, the spinning and sliding determination unit 22 determines whether spinning or sliding has occurred at the train 1, and determines whether an anomaly has occurred in either the speed sensor 50 or the acceleration sensor 60. Consequently, the spinning and sliding detection device 20 can determine the occurrence of spinning or sliding at the train 1 robustly with respect to disturbance factors in the sensors, and determine an anomaly of the sensors themselves. The spinning and sliding detection device 20 can prevent a decrease in the accuracy of detection of spinning and sliding occurring at the train 1.

Second Embodiment

In the first embodiment, the spinning and sliding detection device 20 calculates jerks as the acceleration change amounts to cancel out or remove low frequency components included in detected values from the speed sensor 50 and the acceleration sensor 60. In the second embodiment, the spinning and sliding detection device 20 performs filtering using filters to cancel out or remove low frequency components included in detected values from the speed sensor 50 and the acceleration sensor 60.

In the second embodiment, the configurations of the spinning and sliding detection device 20 and the train 1 equipped with the spinning and sliding detection device 20 are the same as the configurations in the first embodiment illustrated in FIG. 1. As described above, when the travel state of the train 1 is measured using sensors such as the speed sensor 50 and the acceleration sensor 60, the absolute amounts of detected values of the sensors include low frequency variation components such as a gravitational acceleration component due to the gradient of a travel section of the train 1, an attachment error, a zero point deviation, a sensitivity error, a temperature change, a time-varying change, a non-linear error. In view of this, the first change detection unit 211 and the second change detection unit 212 of the spinning and sliding detection device 20 in the present embodiment perform filtering on accelerations so as to cancel out low frequency variation components as described above, and the filtered accelerations are used in the determination by comparison with thresholds.

The first change detection unit 211 periodically calculates the first acceleration of the train 1, using the first speeds of the train 1 acquired from the speed sensor 50, and performs filtering on the first acceleration, using a filter that cancels out low frequency variation components, that is, allows desired frequency components to pass therethrough. The first change detection unit 211 uses the filtered first acceleration as the first change amount. The second change detection unit 212 performs filtering on the second acceleration of the train 1 acquired from the acceleration sensor 60, using a filter that cancels out low frequency variation components, that is, allows desired frequency components to pass therethrough. The second change detection unit 212 uses the filtered second acceleration as the second change amount.

Figure 6:
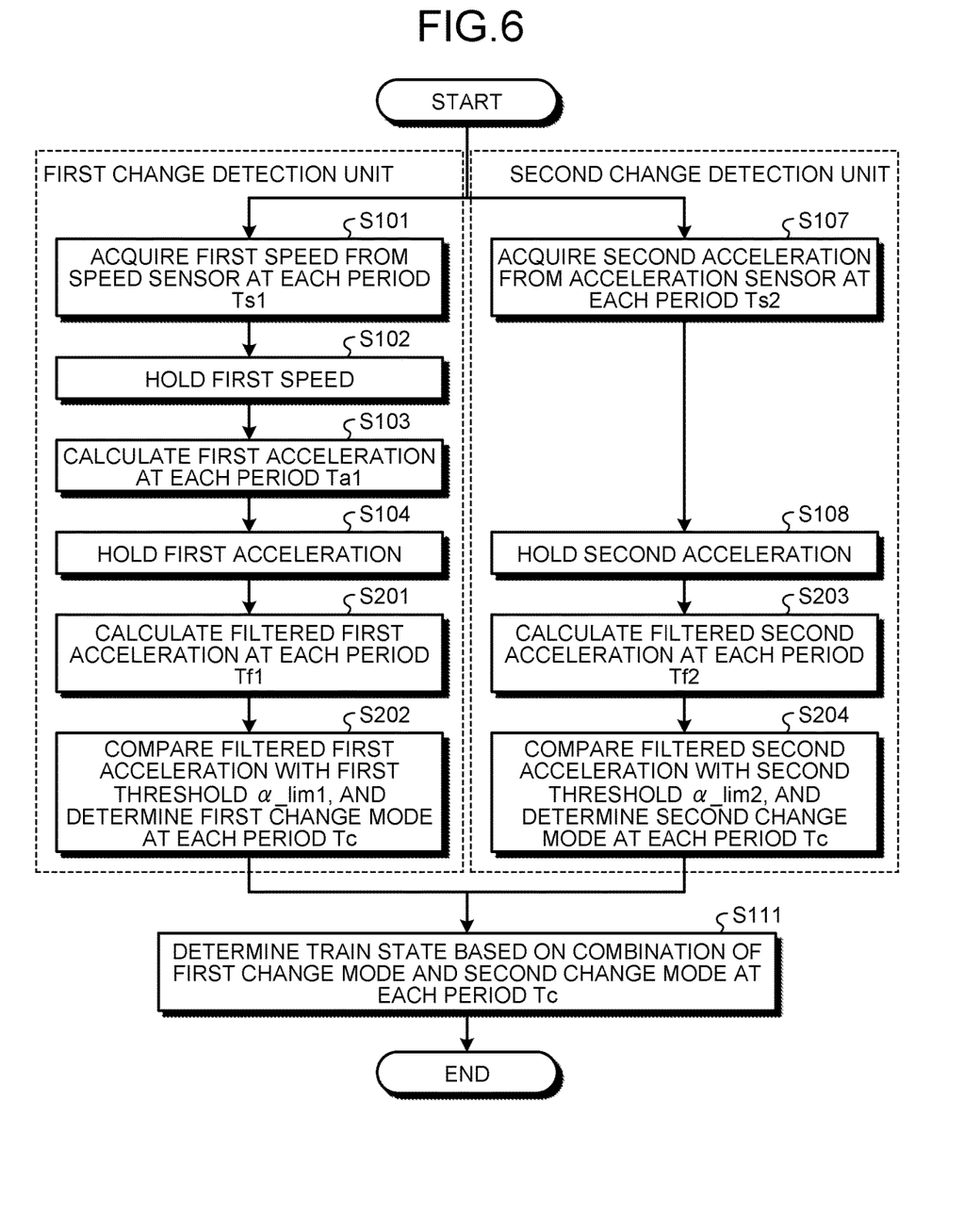
FIG. 6 is a flowchart illustrating the operation of the spinning and sliding detection device according to a second embodiment.

The operation of the spinning and sliding detection device 20 will be described. FIG. 6 is a flowchart illustrating the operation of the spinning and sliding detection device 20 according to the second embodiment. In FIG. 6, the operation in steps S101 to S104, steps S107 to S108, and step S111 is the same as the operation in the first embodiment illustrated in FIG. 3.

The first change detection unit 211 performs filtering on the held first accelerations, and calculates the filtered first acceleration that is the filtered acceleration of the wheel 40 at each period Tf1 (step S201). The filtered first acceleration is defined as the first change amount. The first change detection unit 211 can use a low-pass filter, a band-pass filter, etc. as the filter for removing low frequency variation components of the speed sensor 50. A band-pass filter is a combination of a low-pass filter and a high-pass filter, and can remove the effect of high-frequency electromagnetic noise in addition to the low frequency variation components of the sensor. The first change detection unit 211 can also use a moving-average filter that takes the simple average of the latest L accelerations, an exponential smoothing filter that assigns smaller weights to older values, or the like, using the held first accelerations. The first change detection unit 211 compares the filtered first acceleration with a predetermined first threshold α_lim1, and determines the first change mode on the basis of the comparison result at each period Tc (step S202). The first change detection unit 211 determines the first change mode in the same manner as discussed in the first embodiment although the first threshold α_lim1 and an object compared with the first threshold α_lim1 are different from those discussed in the first embodiment.

The second change detection unit 212 performs filtering on the held second accelerations, and calculates, as the second change amount, the filtered second acceleration that is the filtered acceleration of the vehicle of the train 1 at each period Tf2 (step S203). The filtered second acceleration is defined as the second change amount. The second change detection unit 212 can use a low-pass filter, a band-pass filter, etc. as the filter for removing low frequency variation components of the acceleration sensor 60. A band-pass filter is a combination of a low-pass filter and a high-pass filter, and can remove the effect of high-frequency electromagnetic noise in addition to the low frequency variation components of the sensor. The second change detection unit 212 can also use a moving-average filter that takes the simple average of the latest L accelerations, an exponential smoothing filter that assigns smaller weights to older values, or the like, using the held second accelerations. The second change detection unit 212 compares the filtered second acceleration with a predetermined second threshold α_lim2, and determines the second change mode on the basis of the comparison result at each period Tc (step S204). The second change detection unit 212 determines the second change mode in the same manner as discussed in the first embodiment although the second threshold α_lim2 and an object compared with the second threshold α_lim2 are different from those discussed in the first embodiment.

As described above, according to the present embodiment, in the spinning and sliding detection device 20, the first change detection unit 211 calculates the filtered first acceleration, using the first detected values acquired from the speed sensor 50, selects one of the plurality of first change modes on the basis of the result of a comparison between the filtered first acceleration and the first threshold α_lim1, and outputs the selected first change mode. The second change detection unit 212 calculates the filtered second acceleration, using the second detected value acquired from the acceleration sensor 60, and selects one of the plurality of second change modes on the basis of the result of a comparison between the filtered second acceleration and the second threshold α_lim2, and outputs the selected second mode. On the basis of a combination of the first change mode and the second change mode, the spinning and sliding determination unit 22 determines whether spinning or sliding has occurred at the train 1, and determines whether an anomaly has occurred in either the speed sensor 50 or the acceleration sensor 60. Thus, as in the first embodiment, the spinning and sliding detection device 20 can determine the occurrence of spinning or sliding at the train 1 robustly with respect to disturbance factors in the sensors, and determine an anomaly of the sensors themselves. The spinning and sliding detection device 20 can prevent a decrease in the accuracy of detection of spinning and sliding occurring at the train 1.

Third Embodiment

For the change detection unit 21 in a third embodiment, the first change detection unit 211 changes the first threshold according to a travel section of the train 1, and the second change detection unit 212 changes the second threshold according to a travel section of the train 1. The third embodiment is applicable to the first embodiment and the second embodiment. The third embodiment will be described as being applied to the first embodiment by way of example.

Figure 7:
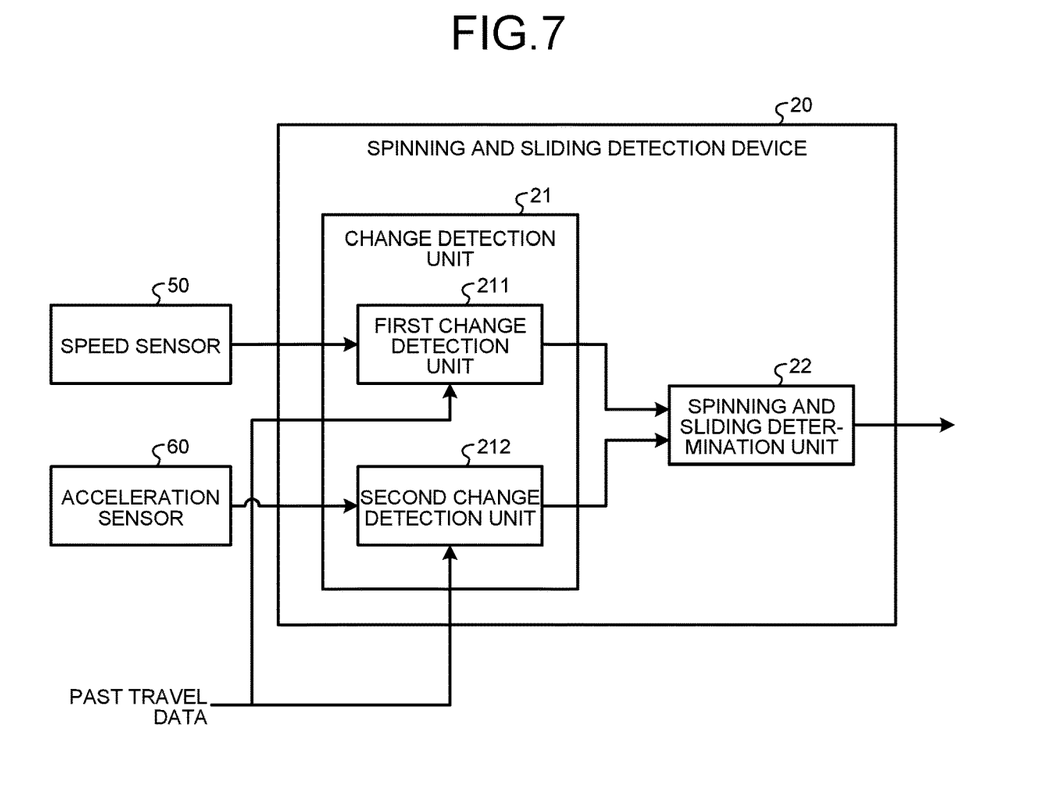
FIG. 7 is a diagram illustrating an example configuration of the spinning and sliding detection device according to a third embodiment.

FIG. 7 is a diagram illustrating an example configuration of the spinning and sliding detection device 20 according to the third embodiment. The change detection unit 21 changes the first threshold and the second threshold on the basis of a travel section of the train 1. Specifically, the first change detection unit 211 of the change detection unit 21 acquires past travel data that is data on the past travel of the train 1. The first change detection unit 211 does not use a fixed first threshold in all travel sections of the train 1. Rather, using the past travel data, the first change detection unit 211 changes the first threshold for determining the first change mode, according to a travel section of the train 1, that is, sets the first threshold successively by learning. For example, for a certain travel section, the first change detection unit 211 uses, as the first threshold, a value obtained by adding a margin to the first jerk during normal travel derived from the past travel data. The first change detection unit 211 may learn and set the first threshold for each travel section by machine learning using the past travel data.

The second change detection unit 212 acquires past travel data that is data on the past travel of the train 1. The second change detection unit 212 does not use a fixed second threshold in all the travel sections of the train 1. Rather, using the past travel data, the second change detection unit 212 changes the second threshold for determining the second change mode, according to a travel section of the train 1, that is, sets the second threshold successively by learning. For example, for a certain travel section, the second change detection unit 212 uses, as the second threshold, a value obtained by adding a margin to the second jerk during normal travel derived from the past travel data. The second change detection unit 212 may learn and set the second threshold for each travel section by machine learning using the past travel data.

The train 1 includes on-board devices such as an integrated train management device and a safety control device (not illustrated in FIG. 1). Such on-board devices have a function of constantly storing a travel log, internal data, etc. of the train 1 for keeping track of system status, analyzing anomalies, etc. Data stored in the above-described on-board devices can be used as the past travel data by the first change detection unit 211 and the second change detection unit 212. The past travel data acquired by the first change detection unit 211 and the second change detection unit 212 may be raw data, i.e., data acquired from the train 1. Alternatively, the past travel data may be data processed such as data analyzed by the on-board devices in such a manner that the processed data becomes a state required for the present embodiment. In the former case, the first change detection unit 211 and the second change detection unit 212 can obtain data equivalent to that in the latter by performing the same processing on the raw data as the processing such as analysis performed by the on-board devices.

As described above, using the past travel data, the spinning and sliding detection device 20 according to the present embodiment can set the first threshold and the second threshold to different values in different travel sections of the train 1. Consequently, the spinning and sliding detection device 20 can improve the accuracy of detection of spinning or sliding occurring at the train 1 as compared with the first embodiment and the second embodiment.

Fourth Embodiment

A description will be made as to a fourth embodiment where a Doppler radar sensor, which is a non-contact speed sensor, is used as the second sensor that acquires speed information on the train 1.

Figure 8:
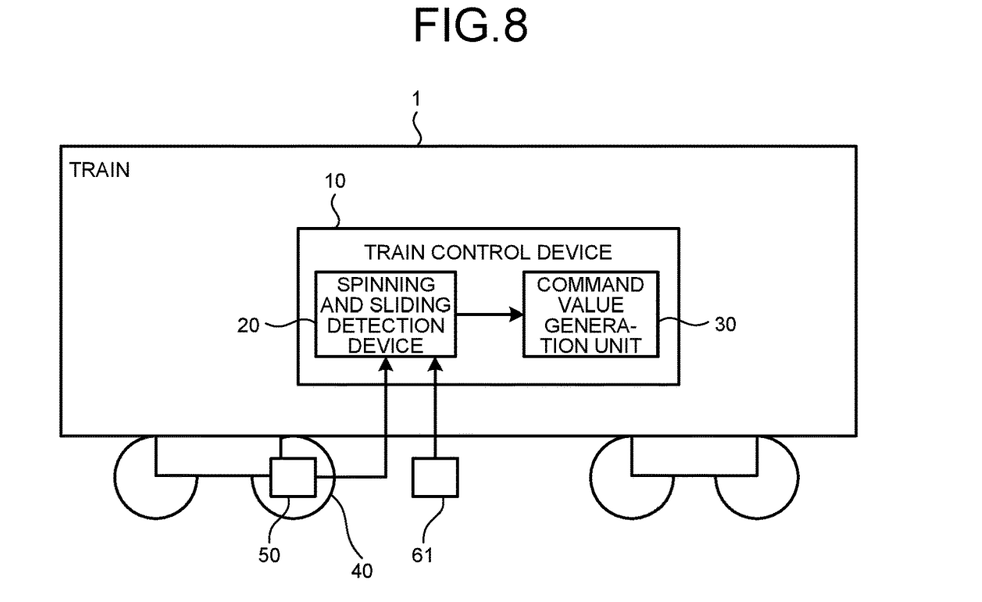
FIG. 8 is a diagram illustrating an example configuration of the train equipped with the spinning and sliding detection device according to a fourth embodiment.

FIG. 8 is a diagram illustrating an example configuration of the train 1 equipped with the spinning and sliding detection device 20 according to the fourth embodiment. The train 1 includes the train control device 10, the speed sensor 50, and a Doppler radar sensor 61. The spinning and sliding detection device 20 can calculate the speed of the train 1 by using a detected value acquired from the Doppler radar sensor 61. Compared with the acceleration sensor 60 illustrated in FIG. 1, the Doppler radar sensor 61 has the following two advantages. (1) The Doppler radar sensor 61 has no effect such as a drift in the sensor itself as the Doppler radar sensor 61 receives reflected waves from the road surface to measure a quantity based on a displacement due to the actual travel of the vehicle of the train 1. (2) The Doppler radar sensor 61 can stably output information such as speed and acceleration regardless of changes in gradient at the train 1. However, the Doppler radar sensor 61 provides these advantages on condition that the train 1 does not pass through places where it is difficult to obtain responses, such as on bridges.

By using the configuration as in FIG. 8, the spinning and sliding detection device 20 can acquire the second detected value from the second sensor to determine spinning or sliding at the train 1.

Fifth Embodiment

A description will be made as to a fifth embodiment where a camera is used as the second sensor that acquires speed information on the train 1.

Figure 9:
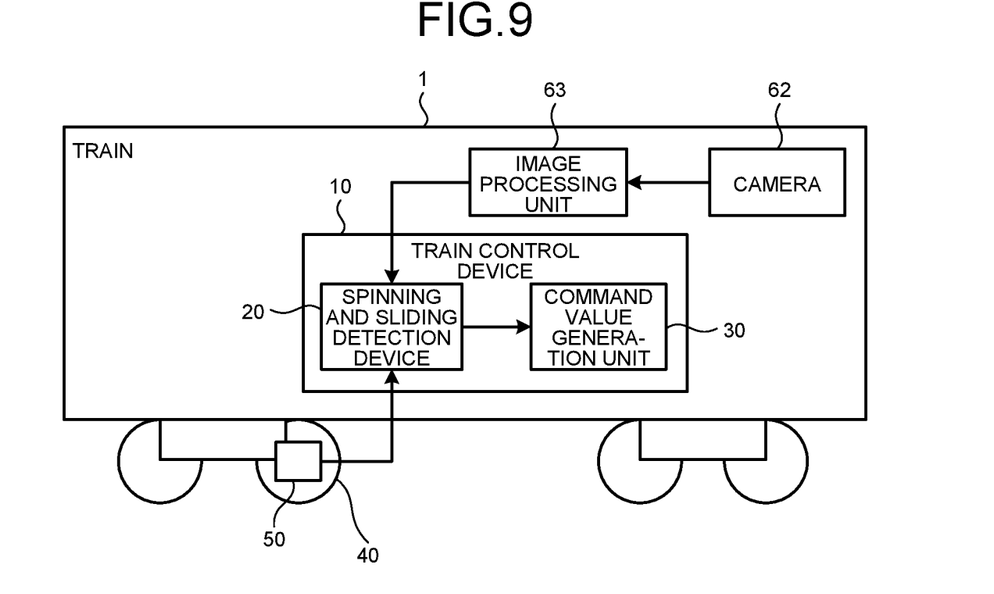
FIG. 9 is a diagram illustrating an example configuration of the train equipped with the spinning and sliding detection device according to a fifth embodiment.

FIG. 9 is a diagram illustrating an example configuration of the train 1 equipped with the spinning and sliding detection device 20 according to the fifth embodiment. The train 1 includes the train control device 10, the speed sensor 50, a camera 62, and an image processing unit 63. The camera 62 periodically captures an image of the surroundings of the train 1 and outputs the captured image to the image processing unit 63. The image processing unit 63 calculates the speed of the train 1 on the basis of image processing. For example, the image processing unit 63 can calculate the speed of the train 1 from a period in which the camera 62 captures images and a difference between images captured by the camera 62. The image processing unit 63 outputs the calculated speed of the train 1 to the spinning and sliding detection device 20.

By using the configuration as in FIG. 9, the spinning and sliding detection device 20 can acquire the second detected value from the second sensor to determine spinning or sliding at the train 1.

Sixth Embodiment

A description will be made as to a sixth embodiment where a receiving apparatus, which is used as the second sensor that acquires speed information on the train 1, receives signals transmitted from transmitting apparatuses installed on the ground for performing wireless communication using ultra-wideband (UWB), which is ultra-wideband wireless communication.

Figure 10:
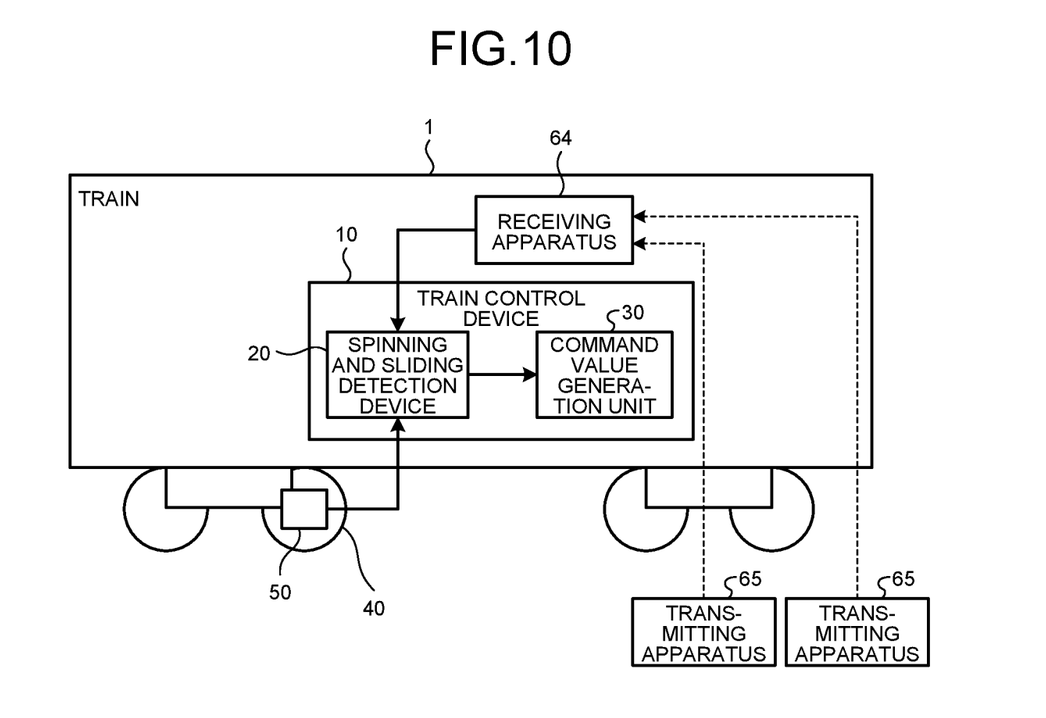
FIG. 10 is a diagram illustrating an example configuration of the train equipped with the spinning and sliding detection device according to a sixth embodiment.

FIG. 10 is a diagram illustrating an example configuration of the train 1 equipped with the spinning and sliding detection device 20 according to the sixth embodiment. The train 1 includes the train control device 10, the speed sensor 50, and a receiving apparatus 64. Transmitting apparatuses 65 that transmit wireless communication signals using UWB are installed on the ground. The receiving apparatus 64 receives signals transmitted from the transmitting apparatuses 65 and obtains, from, e.g., the reception strengths of those signals, a change in the distance value between the receiving apparatus 64 and each transmitting apparatus 65, such that the receiving apparatus 64 can calculate the travel distance of the train 1, and calculate the speed of the train 1 from the travel distance of the train 1 during a specified period. The receiving apparatus 64 outputs the calculated speed of the train 1 to the spinning and sliding detection device 20.

By using the configuration as in FIG. 10, the spinning and sliding detection device 20 can acquire the second detected value from the second sensor to determine spinning or sliding at the train 1.

Seventh Embodiment

A description will be made as to a seventh embodiment where a receiving apparatus, which is used as the second sensor that acquires speed information on the train 1, receives a signal transmitted from a satellite in a global navigation satellite system (GNSS).

Figure 11:
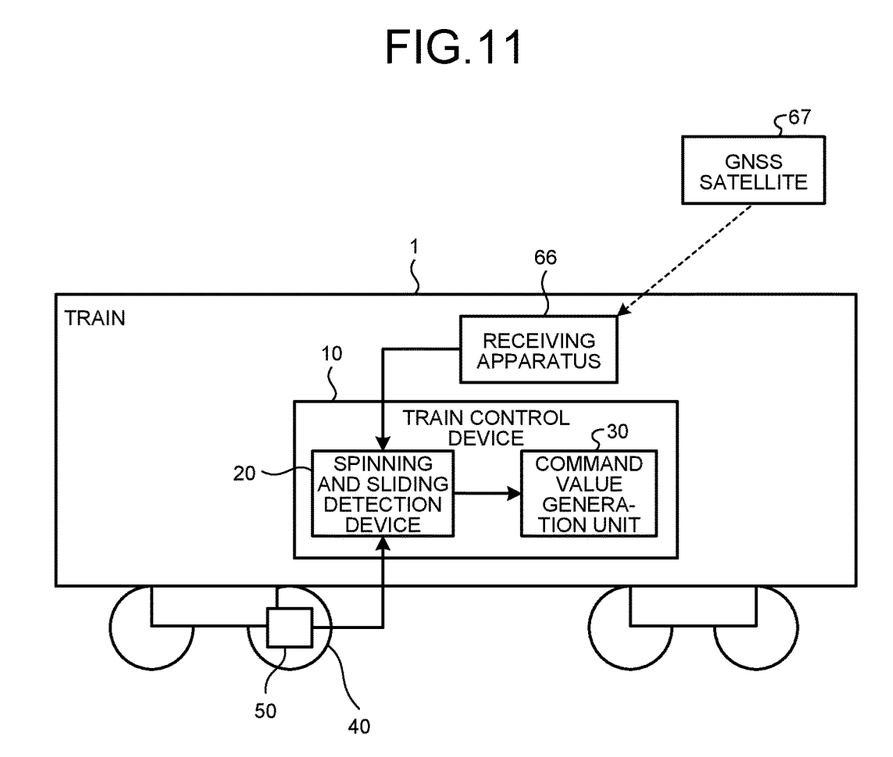
FIG. 11 is a diagram illustrating an example configuration of the train equipped with the spinning and sliding detection device according to a seventh embodiment.

FIG. 11 is a diagram illustrating an example configuration of the train 1 equipped with the spinning and sliding detection device 20 according to the seventh embodiment. The train 1 includes the train control device 10, the speed sensor 50, and a receiving apparatus 66. A GNSS satellite 67 that outputs radio waves including time information etc. is present in the sky. The receiving apparatus 66 can calculate the speed of the train 1 by measuring the Doppler shift in radio waves from the GNSS satellite 67. The receiving apparatus 66 outputs the calculated speed of the train 1 to the spinning and sliding detection device 20.

By using the configuration as in FIG. 11, the spinning and sliding detection device 20 can acquire the second detected value from the second sensor to determine spinning or sliding at the train 1.

Note that the train 1 may include the same or different types of the second sensors described in the first embodiment and the fourth to seventh embodiments. In this case, the change detection unit 21 of the spinning and sliding detection device 20 includes the same number of the second change detection units 212 as the number of the second sensors. The second sensor installed at the train 1 is at least one of: the acceleration sensor 60; the Doppler radar sensor 61; the camera 62; the receiving apparatus 64 that receives signals transmitted from the transmitting apparatuses 65 that perform wireless communication using UWB; and the receiving apparatus 66 that receives a signal transmitted from the GNSS satellite 67.

When the second detected value output from the second sensor is not the second acceleration but a second speed, the second change detection unit 212 calculates the second acceleration. In an example of the first embodiment, the second change detection unit 212 periodically calculates the second acceleration of the train 1, using the second speeds of the train 1 acquired from the second sensor, periodically calculates the second jerk of the train 1, using the second accelerations, and uses the second jerk as the second change amount. In an example of the second embodiment, the second change detection unit 212 periodically calculates the second acceleration of the train 1, using the second speeds of the train 1 acquired from the second sensor, performs filtering on the second acceleration, using a filter that allow desired frequency components to pass therethrough, and uses the filtered second acceleration as the second change amount.

Eighth Embodiment

In an eighth embodiment, the first change detection unit 211 of the change detection unit 21 of the spinning and sliding detection device 20 acquires detected values from the speed sensor 50 and the acceleration sensor 60, selects one change mode from a plurality of change modes, and outputs the selected change mode. The third embodiment is applicable to the first embodiment and the second embodiment. Here, application to the first embodiment will be described as an example.

Figure 12:
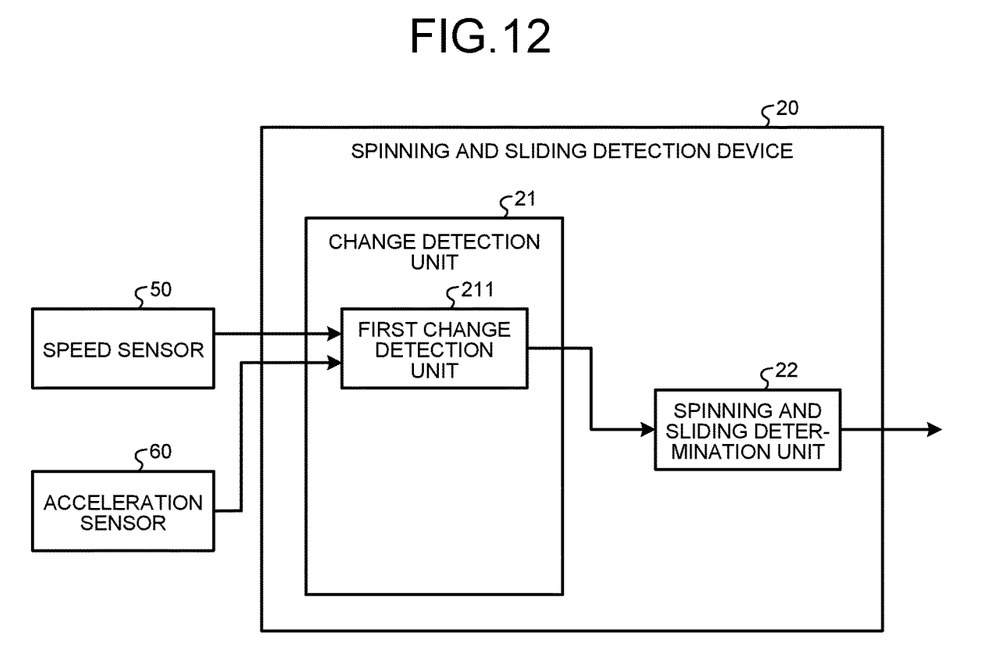
FIG. 12 is a diagram illustrating an example configuration of the spinning and sliding detection device according to an eighth embodiment.

FIG. 12 is a diagram illustrating an example configuration of the spinning and sliding detection device 20 according to the eighth embodiment. The spinning and sliding detection device 20 includes the change detection unit 21 and the spinning and sliding determination unit 22. The change detection unit 21 selects and outputs a change mode on the basis of a comparison result obtained by comparing, with the first threshold and the second threshold, a value obtained by adding the first change amount and the second change amount or a value obtained by subtracting the second change amount from the first change amount. The change detection unit 21 includes the first change detection unit 211. The spinning and sliding determination unit 22 determines the state of the train 1 on the basis of the change mode acquired from the change detection unit 21. For example, the spinning and sliding determination unit 22 selects one of K state outputs on the basis of Q change modes acquired from the change detection unit 21, and outputs the selected state output to the command value generation unit 30.

The operation of the first change detection unit 211 will be described in detail. The first change detection unit 211 acquires the first speed, which is the first detected value, from the speed sensor 50 at each period Ts1, calculates the first acceleration at each period Ta1, and calculates the first jerk at each period Tj1. In addition, the first change detection unit 211 acquires the second acceleration, which is the second detected value, from the acceleration sensor 60 at each period Ts2, and calculates the second jerk at each period Tj2. In the present embodiment, the first jerk is referred to as a jerk j1, and the second jerk is referred to as a jerk j2. When a threshold for sliding determination is referred to as a first threshold jlimA and a threshold for sensor anomaly determination is referred to as a second threshold jlimB, the first change detection unit 211 defines M=4 as the number M of change modes to be output to the spinning and sliding determination unit 22.

Specifically, case (1) is where $|j1|<|j2|+jlimA$ is defined as a change mode in which the train 1 is in a normal operating condition. Case (2) is where $|j1|>|j2|+jlimA$ is defined as a change mode in which the train 1 is in a sliding condition. Case (3) is where $|j1|>|j2|+jlimB$ is defined as a change mode in which the speed sensor 50 that is a speed generator of the train 1 is in an anomaly condition. Case (4) is where $|j1|>jlimA$ and $|j2|>jlimA$ is defined as a change mode in which the train is in a sudden acceleration/deceleration condition due to a collision of the train 1, etc.

When the first change detection unit 211 determines the change mode, it is possible to add case (5) where $|j1|<jlimA$ and $|j2|>jlimB$ is defined as a change mode in which the acceleration sensor 60 is in an anomaly condition. That is, the number M of change modes may be five or more.

Instead of using the first threshold jlimA and the second threshold jlimB fixed in all travel sections of the train 1, the first change detection unit 211 may acquire past travel data from on-board devices (not illustrated) etc., and change the first threshold jlimA and the second threshold jlimB according to a travel section of the train 1, that is, successively set the first threshold jlimA and the second threshold jlimB by learning, as in the third embodiment. For example, for a certain travel section, the first change detection unit 211 uses, as the first threshold jlimA and the second threshold jlimB, values obtained by adding margins to the jerks during normal travel derived from the past travel data. The first change detection unit 211 may learn and set the first threshold jlimA and the second threshold jlimB for each travel section by machine learning using the past travel data. Using time-series data on detected values acquired from the speed sensor 50 and the acceleration sensor 60, the first change detection unit 211 may remove noise components by filtering etc. when a certain amount of error constantly exists between the two sensor outputs.

In the present embodiment, unlike in the first embodiment, the first change detection unit 211 outputs a change mode with content equivalent to that of the spinning and sliding determination unit 22. The spinning and sliding determination unit 22 outputs the state of the train 1 to the command value generation unit 30 at each period Tc, using Q change modes from the first change detection unit 211. A method by which the spinning and sliding determination unit 22 determines the state of the train 1, using Q change modes is the same as the method in the first embodiment by which the spinning and sliding determination unit 22 outputs one determination result obtained on the basis of Q determination results.

The present embodiment has been described taking an example where the first change detection unit 211 determines the change mode using the two thresholds, that is, the first threshold jlimA and the second threshold jlimB. However, these operations may be performed by the spinning and sliding determination unit 22. Only the sharing of the operations between the components in the spinning and sliding detection device 20 is different, and processing load in the spinning and sliding detection device 20 is not changed.

As described above, according to the present embodiment, the spinning and sliding detection device 20 can set change modes more finely by evaluating the sum of or difference between two jerks calculated from detected values of the two sensors or between two filtered accelerations. In the train 1, since the spinning and sliding detection device 20 can set change modes more finely, it is possible to detect an anomaly in the state of the train 1 at an early stage.

The configurations described in the above embodiments illustrate an example and can be combined with another known art. The embodiments can be combined with each other. The configurations can be partly omitted or changed without departing from the gist.

REFERENCE SIGNS LIST

1 train; 10 train control device; 20 spinning and sliding detection device; 21 change detection unit; 22 spinning and sliding determination unit; 30 command value generation unit; 40 wheel; 50 speed sensor; 60 acceleration sensor; 61 Doppler radar sensor; 62 camera; 63 image processing unit; 64, 66 receiving apparatus; 65 transmitting apparatus; 67 GNSS satellite; 211 first change detection unit; 212 second change detection unit.

The invention claimed is:

1. A spinning and sliding detection device to be installed in a train, the device comprising:
   change detection circuitry to periodically acquire a first detected value from a first sensor to detect a rotational state of a wheel of the train, calculate a first change amount, using the first detected values, periodically acquire a second detected value from a second sensor to detect speed or acceleration of the train, calculate a second change amount, using the second detected values, and select a change mode on a basis of a combination of a plurality of change modes defined for determining whether spinning or sliding has occurred at the train, using the first change amount, the second change amount, a first threshold, and a second threshold different from the first threshold for obtaining the plurality of change modes, and output the selected change mode; and
   spinning and sliding determination circuitry to determine whether spinning or sliding has occurred at the train and determine whether a failure has occurred in either the first sensor or the second sensor, on a basis of the change mode acquired from the change detection circuitry.

2. The spinning and sliding detection device according to claim 1, wherein
   the change detection circuitry includes
   first change detection circuitry to periodically acquire the first detected value from the first sensor, calculate the first change amount, using the first detected values, and select one first change mode from a plurality of first change modes on the basis of a comparison result obtained by comparing the first change amount with the first threshold and output the selected first change mode, the plurality of first change modes being the change modes and indicating states of change in the first detected value and
   second change detection circuitry to periodically acquire the second detected value from the second sensor, calculate the second change amount using the second detected values, and select one second change mode from a plurality of second change modes on the basis of a comparison result obtained by comparing the second change amount with the second threshold and output the selected second change mode, the plurality of second change modes being the change modes and indicating states of change in the second detected value, and
   the spinning and sliding determination circuitry determines whether spinning or sliding has occurred at the train and determines whether a failure has occurred in either the first sensor or the second sensor, on the basis of a combination of the first change mode and the second change mode.

3. The spinning and sliding detection device according to claim 2, wherein
   the first change detection circuitry periodically calculates a first acceleration of the train, using first speeds of the train acquired from the first sensor, periodically calculates a first jerk of the train, using the first accelerations, and uses the first jerk as the first change amount, and
   the second change detection circuitry periodically calculates a second acceleration of the train, using second speeds of the train acquired from the second sensor, periodically calculates a second jerk of the train, using the second accelerations, and uses the second jerk as the second change amount, or the second change detection unit calculates a second jerk of the train, using second accelerations of the train acquired from the second sensor, and uses the second jerk as the second change amount.

4. The spinning and sliding detection device according to claim 2, wherein
   the first change detection circuitry periodically calculates a first acceleration of the train, using first speeds of the train acquired from the first sensor, performs filtering on the first acceleration, using a filter that allows desired frequency components to pass therethrough, and uses the filtered first acceleration as the first change amount, and
   the second change detection circuitry periodically calculates a second acceleration of the train, using second speeds of the train acquired from the second sensor, performs filtering on the second acceleration, using a filter that allows desired frequency components to pass therethrough, and uses the filtered second acceleration as the second change amount, or the second change detection unit performs filtering on a second acceleration of the train acquired from the second sensor, using a filter that allows desired frequency components to pass therethrough, and uses the filtered second acceleration as the second change amount.

5. The spinning and sliding detection device according to claim 2, wherein
   when the train includes a plurality of the second sensors, the change detection circuitry includes the same number of the second change detection units as the number of the second sensors.

6. The spinning and sliding detection device according to claim 2, wherein
   when there are three or more first change modes as the plurality of first change modes, and there are three or more second change modes as the plurality of second change modes,
   the spinning and sliding determination circuitry further determines a sign of occurrence of spinning or sliding at the train and determines a sign of failure of either the first sensor or the second sensor.

7. The spinning and sliding detection device according to claim 1, wherein
   the change detection circuitry selects and outputs the change mode, on the basis of a comparison result obtained by comparing, with the first threshold and the second threshold, a value obtained by adding the first change amount and the second change amount or a value obtained by subtracting the second change amount from the first change amount.

8. The spinning and sliding detection device according to claim 1, wherein
   the second sensor is at least one of: an acceleration sensor; a Doppler radar sensor; a camera; a receiving apparatus to receive signals transmitted from transmitting apparatuses to perform wireless communication using ultra-wideband that is ultra-wideband wireless communication; and a receiving apparatus to receive a signal transmitted from a satellite in a global navigation satellite system.

9. The spinning and sliding detection device according to claim 1, wherein
the change detection circuitry changes the first threshold and the second threshold on the basis of a travel section of the train.

10. A spinning and sliding detection method for a spinning and sliding detection device to be installed in a train, the method comprising:
periodically acquiring a first detected value from a first sensor to detect a rotational state of a wheel of the train, calculating a first change amount, using the first detected values, periodically acquiring a second detected value from a second sensor to detect speed or acceleration of the train, calculating a second change amount, using the second detected values, and selecting a change mode on a basis of a combination of a plurality of change modes defined for determining whether spinning or sliding has occurred at the train, using the first change amount, the second change amount, a first threshold, and a second threshold different from the first threshold for obtaining the plurality of change modes, and outputting the selected change mode; and
determining whether spinning or sliding has occurred at the train and determining whether a failure has occurred in either the first sensor or the second sensor, on a basis of the selected change mode.

11. The spinning and sliding detection method according to claim 10, wherein
calculating the first change amount, calculating the second change amount, and selecting and outputting the change mode includes:
(i) periodically acquiring the first detected value from the first sensor, calculating the first change amount, using the first detected values, and selecting one first change mode from a plurality of first change modes, on the basis of a comparison result obtained by comparing the first change amount with the first threshold and outputting the selected first change mode, the plurality of first change modes being the change modes and indicating states of change in the first detected value; and
(ii) periodically acquiring the second detected value from the second sensor, calculating the second change amount using the second detected values, and selecting one second change mode from a plurality of second change modes on the basis of a comparison result obtained by comparing the second change amount with the second threshold and outputting the selected second change mode, the plurality of second change modes being the change modes and indicating states of change in the second detected value and
determining whether the spinning or sliding has occurred at the train and determining whether the failure has occurred in either the first sensor or the second sensor includes determining whether spinning or sliding has occurred at the train and determines whether a failure has occurred in either the first sensor or the second sensor, on the basis of a combination of the first change mode and the second change mode.

12. The spinning and sliding detection method according to claim 11, wherein
calculating the first change amount, calculating the second change amount, and selecting and outputting the change mode includes:
(i) periodically calculating a first acceleration of the train, using first speeds of the train acquired from the first sensor, periodically calculating a first jerk of the train, using the first accelerations, and using the first jerk as the first change amount; and
(ii) periodically calculating a second acceleration of the train, using second speeds of the train acquired from the second sensor, periodically calculating a second jerk of the train, using the second accelerations, and using the second jerk as the second change amount, or
calculating a second jerk of the train, using second accelerations of the train acquired from the second sensor, and using the second jerk as the second change amount.

13. The spinning and sliding detection method according to claim 11, wherein
calculating the first change amount, calculating the second change amount, and selecting and outputting the change mode include:
(i) periodically calculating a first acceleration of the train, using first speeds of the train acquired from the first sensor, performing filtering on the first acceleration, using a filter that allows desired frequency components to pass therethrough, and using the filtered first acceleration as the first change amount; and
(ii) periodically calculating a second acceleration of the train, using second speeds of the train acquired from the second sensor, performing filtering on the second acceleration, using a filter that allows desired frequency components to pass therethrough, and using the filtered second acceleration as the second change amount, or
performing filtering on a second acceleration of the train acquired from the second sensor, using a filter that allows desired frequency components to pass therethrough, and using the filtered second acceleration as the second change amount.

14. The spinning and sliding detection method according to claim 11, wherein
the spinning and sliding detection device includes change detection circuits to calculate the second change, and select and output the selected second change mode
when the train includes a plurality of the second sensors, the change detection circuits are the same in number as the second sensors.

15. The spinning and sliding detection method according to claim 11, wherein
when there are three or more first change modes as the plurality of first change modes, and there are three or more second change modes as the plurality of second change modes,
in determining whether the spinning or sliding has occurred at the train and determining whether the failure has occurred in either the first sensor or the second sensor, the method further includes determining a sign of occurrence of spinning or sliding at the train and determines a sign of failure of either the first sensor or the second sensor.

16. The spinning and sliding detection method according to claim 10, wherein
in calculating the first change amount, calculating the second change amount, and selecting and outputting the change mode, the method selects and outputs the change mode, on the basis of a comparison result obtained by comparing, with the first threshold and the second threshold, a value obtained by adding the first change amount and the second change amount or a value obtained by subtracting the second change amount from the first change amount.

17. The spinning and sliding detection method according to claim 10, wherein the second sensor is at least one of: an acceleration sensor; a Doppler radar sensor; a camera; a receiving apparatus to receive signals transmitted from transmitting apparatuses to perform wireless communication using ultra-wideband that is ultra-wideband wireless communication; and a receiving apparatus to receive a signal transmitted from a satellite in a global navigation satellite system.

18. The spinning and sliding detection method according to claim 10, wherein
in calculating the first change amount, calculating the second change amount, and selecting and outputting the change mode, the method changes the first threshold and the second threshold on the basis of a travel section of the train.

\* \* \* \* \*